United States Patent Office 3,428,692
Patented Feb. 18, 1969

---

3,428,692
PREPARATION OF NONIONIC DETERGENTS
Charles M. Starks and Eugene F. Kennedy, Ponca City,
Okla., assignors to Continental Oil Company, Ponca
City, Okla., a corporation of Delaware
No Drawing. Filed Feb. 28, 1966, Ser. No. 530,373
U.S. Cl. 260—613                 5 Claims
Int. Cl. C07c 43/20

ABSTRACT OF THE DISCLOSURE

Polyoxyethylene ether nonionic detergents of the general structure $R(OCH_2CH_2)_nOCH_2CH_2OH$ in which R is a detergent range alkyl or alkyl substituted phenyl radical is heated in the presence of nickel catalyst to provide a corresponding nonionic detergent wherein the terminal —$CH_2OH$ grouping is replaced with a hydrogen atom.

---

This invention relates to a method for preparing oxyalkylene ether compounds. More particularly, it relates to the preparation of such compounds by a method wherein a terminal hydroxy ethoxy group of an ethoxylate is converted to a methoxy group by effecting the dehydrogenation and decarbonylation thereof in the presence of nickel or cobalt catalyst. A further aspect of the present invention concerns the preparation of a class of water-soluble nonionic detergents having low foaming properties.

A widely practiced synthesis method for preparing a number of valuable chemical substances involves the reaction of a compound having a replaceable hydrogen atom, i.e., an aliphatic or aromatic alcohol with ethylene oxide. In accordance with this method, one or more moles of the ethylene oxide can be reacted with such a compound via its hydroxyl substituent. When a plurality of moles of the ethylene oxide is used, a polyoxyethylene ether is obtained having a terminal hydroxy ethoxy group.

The above-described method can be utilized to prepare specialty solvents as is the case when a mole of ethylene oxide is reacted with a mole of a lower aliphatic alcohol. Likewise, an important class of water-soluble nonionic detergents are obtained by reacting a plurality of moles of ethylene oxide with a mole of a detergent range aliphatic monobasic alcohol or a phenol.

This invention is specifically concerned with the chemical alteration or conversion of the foregoing types of ethoxylates. In accordance with this invention, a process is provided for economically converting the terminal hydroxy ethoxy radical or radicals of said ethoxylated products to a methoxy radical or radicals. Thus, a ready way is now provided for making an alkylene glycol dimethoxy ether solvent and also polyalkylene glycol dimethoxy ethers having utility as specialty solvents and plasticizers. Further, through the practice of our novel process one can economically convert by-product polyethylene glycols obtained in the manufacture of ethylene glycol into useful products of the aforesaid types.

Another important feature of the invention resides in beneficially changing the foaming characteristics of the class of nonionic detergents comprising an ethoxylate of an aliphatic detergent range mono-alcohol or a phenol. It has been found that in effecting the conversion of the terminal hydroxyethoxy group of these classes of nonionic detergents no observable degree of detergency power is sacrificed; nevertheless, the resultant change of the molecular structure of these detergents results in a surfactant exhibiting substantially lower foaming characteristics than the comparable hydroxy ethoxy terminated species.

Broadly stated, the instant process comprises heating an ethoxylate of an alkylene glycol, a phenol or an aliphatic mono-alcohol including an ethoxylate of an addition product of an aliphatic mono-alcohol and an alkylene oxide having in excess of two carbon atoms at a temperature in excess of 150° C. in the presence of nickel or cobalt catalyst whereby one or more of the terminal hydroxy ethoxy groups is deformylated. By deformylation is understood the splitting out of carbon monoxide and hydrogen from the affected terminal hydroxy ethoxy radical to provide the methoxy radical. The deformylation reaction presumably involves preliminary dehydrogenation of the terminal hydroxy group to an aldehyde group followed by loss of carbon monoxide. This conversion is illustrated in the following reaction scheme in which R represents an alkyl or phenyl group, an aliphatic diol or a polyalkylene ether thereof

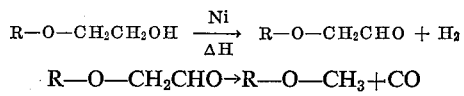

$$R-O-CH_2CHO \rightarrow R-O-CH_3 + CO$$

Deformylation is carried out in the liquid phase and preferably at atmospheric pressure. A minimum practical temperature for effecting deformylation is in the order of about 150° C. Higher temperatures than this, however, are ordinarily preferred. Selection of any particular operating temperature is primarily governed by the volatility characteristics of the particular ethoxylated product so treated, its heat stability, the manner contemplated for the recovery of the converted product, and so forth. A preferred range of temperatures for conducting the deformylation reaction is from about 200 to 300° C.

As mentioned hereinbefore, deformylation is conducted in the presence of nickel or cobalt catalyst or the oxides of these metals. Finely divided active nickel represents the preferred catalyst. Raney nickel is especially effective. The amount of catalyst that can be employed for this purpose ranges from about 1 to 15% based upon the weight of the ethoxylate treated. The length of time required to effect a desired degree of deformylation depends upon the temperature observed, etc. The extent to which deformylation is progressing can be readily determined by ascertaining the hydroxyl number of the ethoxylate during the course of the reaction in those instances where only noncondensable gaseous by-products are taken overhead.

In order to further illustrate to those skilled in the art the nature of this invention and the best mode contemplated for carrying it out, the following working examples are presented. As indicated, these examples are given primarily by way of illustration and therefore any enumeration of details contained therein should not be interpreted as a limitation on the invention except as such limitations appear in the appended claims. All parts are parts by weight unless otherwise stated.

Example I

Into a suitable reaction vessel equipped with condenser column were charged 272 parts of triethylene glycol and 7 parts of a commercial grade of reduced nickel powder catalyst. The charged mixture was heated at 200–240° C. for six hours. After the indicated holding time, the temperature was raised to about 300° C. to distill all of the liquid from the nickel. By gas chromatography analysis, the distillate recovered (150 parts) analyzed 50% diethylene glycol mono-methyl ether, 21% ethylene glycol dimethyl ether and 29% unidentified material. The infrared spectrum of the product indicated the unidentifiable material to be aldehydic.

Example II

Into a suitable reaction vessel equipped with receivers for recovering noncondensable and condensable overheads were charged 211 grams diethylene glycol and 2 grams of nickel catalyst of hte same type employed in Example I. This mixture was heated at a temperature of 235–243° C. for eight hours. During this holding time, 126 grams of distillate and 135 liters of gas were obtained. The distillate, as analyzed by chromatography, was found to consist of about 61% ethylene glycol mono-methyl ether, 20% (2-hydroxy ethoxy) acetaldehyde, 9% unidentified material and 10% unreacted diethylene glycol.

Example III

This example illustrates a method in accordance with the present invention for lowering the foaming characteristics of a type of nonionic surfactant commonly employed as an active component in detergent formulations designed for household laundering applications.

A mixture of about 13% n-dodecanol-1, 11% n-tetradecanol-1, 51% n-hexadecanol-1 and 25% n-octadecanol-1 was ethoxylated using base catalysts to an average of about 8.5 ethylene oxide molecules per molecule of alcohol to provide an ethoxylate having an average molecular weight of 620.

To a suitable reaction vessel were charged 470 grams of the ethoxylated alcohol mixture along with 40 grams of a commercial nickel catalyst. The reaction mixture was heated with stirring to 250–260° C. After two hours, 1.72 cubic feet of gases had been evolved and although gas evolution had not ceased, the reaction was stopped to obtain an intermediate product. The total reaction product was cooled and filtered to give a clear, colorless liquid designated product A. A portion of product A in the amount of 237 grams was heated with an additional 22 grams of nickel catalyst at a temperature of 250–260° C. for two hours, at which time evolution of gas had virtually ceased. In this interim 0.467 cubic foot of gas was recovered. After cooling, the nickel catalyst was removed by filtration to give 222 grams of a clear liquid which was designated product B.

Products A and B along with a control sample of the original ethoxylated alcohol mixture were compounded into a standard heavy duty formulation, and the respective compositions were then tested for detergency and foam stability. Detergency characteristics were determined by washing standard soiled swatches of cloth in a controlled mechanical washing operation. Detergency ratings for this test are given on an arbitrary numerical scale statistically adjusted so that a difference of one unit is required for denoting significance. Foam stability was determined by washing uniformly soiled dinner plates at 115° F. in a bath containing 0.125% concentration of the detergent composition. The end point was ascertained by noting the number of washed plates which results in a permanent break in the foam covering the dish pan. The results of these tests are set forth in the following Table I.

TABLE I

| Sample | Avg. Detergency Rating | | Foam Stability [1] | |
|---|---|---|---|---|
| | 50 p.p.m.[2] | 300 p.p.m.[2] | 50 p.p.m.[2] | 300 p.p.m.[2] |
| Control | 25.3 | 25.1 | | |
| Product A | 25.7 | 24.9 | −5 | −6 |
| Product B | 25.6 | 24.8 | −8 | −9 |

[1] A negative number means that the sample washed that many les plates than the control sample.
[2] Hardness.

The above results show that by practice of this invention, nonionic detergents comprising an ethoxylate of an aliphatic mono-alcohol can be converted into products having equivalent detergency power while at the same time exhibiting substantially decreased foaming ability. The foregoing example further illustrates that the foaming ability of the detergent can be varied depending upon the extent of deformylation to which the starting ethoxylate material is subjected.

Aliphatic mono-alcohols ranging in carbon atom length from about 8–18 can be used for preparing the type of nonionic detergent exemplified in this example. The lower alcohols of the range stated are preferred for preparing nonionics having particular usefulness in metal cleaning applications and the like; whereas, $C_{12}$ and $C_{18}$ alcohols, especially the linear primary alcohols of this range of carbon atom lengths, are preferred for preparing detergents designed primarily for general laundering applications. The latter type of nonionics generally contain on an average from about 6–12 moles ethylene oxides per mole of the alcohol. When preparing detergents from the lower molecular weight alcohols mentioned, i.e., $C_8$–$C_{11}$, it is common practice to react as little as three moles of the ethylene oxide per mole of the alcohol.

Comparable nonionics to the ethoxylates of the $C_{12}$–$C_{18}$ alcohols are represented by the ethoxylates of a phenol. Particularly preferred phenols for this purpose are the alkyl substituted phenols containing from about 8–12 carbon atoms in the alkyl group, and especially nonyl phenol and dodecyl phenol. This class of detergents can likewise be deformylated in accordance with this invention to provide lower foaming versions thereof without any sacrifice of detergency power.

Another variant for preparing nonionic detergents of the types concerned herein is to condense initially one or more moles of propylene oxide with a selected aliphatic monoalcohol or phenol, followed by further condensation with one or more moles of ethylene oxide. These products can also be deformylated for the purpose of lowering the foaming stability thereof. Accordingly, the word "ethoxylate" contemplates not only those nonionic detergents prepared using ethylene oxide solely but also those corresponding polyalkylene ether products "capped" with at least one mole of ethylene oxide per mol of the starting addition product.

We claim:

1. A method for treating nonionics which comprises heating a compound consisting essentially of a compound selected from the group consisting of polyethylene glycols, the monoalkyl ethers thereof wherein the alkyl is $C_8$ to $C_{18}$ and the mono $C_8$–$C_{12}$ alkyl substituted phenyl ethers thereof, in the liquid phase at a temperature between about 200° and 300° C. in the presence of from about 1–15 percent metallic nickel or an oxide thereof based on the weight of said nonionic detergent for a time sufficient to lower the foaming characteristics of the said nonionic detergent, said time being at least about 2 hours.

2. The method of claim 1 wherein said polyethylene glycol is substantially completely deformylated.

3. A process in accordance with claim 1 wherein said aliphatic mono-alcohol is a primary alcohol of from about 12–18 carbon atoms.

4. A process in accordance with claim 3 wherein said polyoxyethylene ether is an addition product of from about 6–12 moles of ethylene oxide and one mole of said alcohol.

5. A process in accordance with claim 4 wherein said primary aliphatic mono-alcohol is a linear alcohol.

References Cited

UNITED STATES PATENTS

| 1,970,578 | 8/1934 | Schoeller et al. | 260—615 |
| 2,510,540 | 6/1950 | Ballard et al. | 260—615 |
| 2,596,091 | 5/1952 | Benneville | 260—611 |
| 2,609,344 | 9/1952 | Johnson | 260—615 XR |
| 2,286,034 | 6/1942 | Gresham | 260—602 |

BERNARD HELFIN, Primary Examiner.

U.S. Cl. X.R.

260—615